United States Patent [19]

Rees et al.

[11] 4,029,729

[45] June 14, 1977

[54] ROTATIONAL MOLDING AND COMPOSITIONS THEREFOR

[75] Inventors: Robert L. Rees; Fay W. Bailey, both of Bartlesville, Okla.

[73] Assignee: Phillips Petroleum Company, Bartlesville, Okla.

[22] Filed: May 8, 1972

[21] Appl. No.: 251,474

Related U.S. Application Data

[60] Division of Ser. No. 69,190, Sept. 2, 1970, abandoned, which is a continuation-in-part of Ser. No. 808,000, March 17, 1969, abandoned.

[52] U.S. Cl. .............................. 264/310; 526/227; 264/331; 264/349
[51] Int. Cl.² .......................................... B29C 5/04
[58] Field of Search .......................... 264/310–312, 264/211, 349, 331; 260/94.9 GA; 526/228, 227

[56] References Cited

UNITED STATES PATENTS

| | | | |
|---|---|---|---|
| 3,214,422 | 10/1965 | Mageli et al. | 260/94.9 GA |
| 3,445,551 | 5/1969 | Griffin | 264/310 |
| 3,474,165 | 10/1969 | Rakes et al. | 264/312 |
| 3,627,869 | 12/1971 | Walton | 264/310 |

Primary Examiner—Jeffery R. Thurlow

[57] ABSTRACT

Polymers of ethylene having a melt index of at least 10 are simultaneously rotationally molded and crosslinked by an acetylenic diperoxy compound to produce molded articles having high impact strength and stress cracking resistance.

14 Claims, No Drawings

ROTATIONAL MOLDING AND COMPOSITIONS THEREFOR

This is a division of application Ser. No. 69,190, filed Sept. 2, 1970, now abandoned which is a continuation-in-part of application Ser. No. 808,000, filed Mar. 17, 1969, now abandoned.

This invention relates to rotational molding. In one aspect it relates to a composition of matter useful in rotational molding. In another aspect it relates to a method of rotational molding.

Rotational molding is accomplished by supplying to a mold a measured amount of powdered thermoplastic moldable material and rotating the mold while heating it to fuse the thermoplastic powder and then cooling the mold to cause the molded article to solidify. Usually the mold is closed and is rotated around more than one axis, for example two axes at right angles, to distribute the powdered material throughout the mold to produce a completely closed article.

It is highly desirable to produce by rotational molding articles which are suitable for severe service requirements. For example, it is desirable to produce articles having high impact strength and resistance to stress cracking. Polymers of ethylene, including homopolymers and copolymers of ethylene and olefin hydrocarbons having 3 to 8 carbon atoms per molecule including butene, and mixtures of such polymers, have many properties which make them attractive for the production of rotationally molded articles, if high impact strength and resistance to stress cracking can be achieved simultaneously with good molding of the article.

In order to obtain good molding characteristics to produce well formed rotationally molded articles it is necessary to use polymers of ethylene having high values of melt index, for example polymers having a melt index above about 5. It has been desirable to use high density polymers of ethylene in order to obtain the highest possible values for chemical resistance, rigidity and softening temperature. One of the best polymers of ethylene for rotational molding known to us prior to the present invention is one having a density of 0.962, a melt index of 6.5, and environmental stress cracking resistance (ESCR) <1. Polymers have been known having higher values of melt index but articles made from these polymers by rotational molding have been completely unsatisfactory since they had extremely low values of impact strength. We have not previously known of any polymers of ethylene of any type which could be molded satisfactorily by rotational molding to produce articles having excellent values of environmental stress cracking resistance (ESCR).

An object of the invention is to produce a composition useful for rotational molding to produce articles having well molded form and good physical properties. Another object of the invention is to produce rotationally molded articles having high impact strength and resistance to stress cracking from polymers of ethylene.

As used in this application the following properties are measured according to the test described by the American Society of Testing Materials under the designation listed below and are in the units indicated:

Melt Index (M.I.) ASTM D-1238-62T, grams/10 min., Condition E.
High Load Melt Index (HlMI) ASTM D-1238-62T, Condition F, grams/10 min.
Density ASTM D-1505-63T, grams/cc.
Environmental Stress Cracking Resistance (ESCR) ASTM D-1693-66, hours.
Tensile Tear ASTM D-1004-66, lbs./mil thickness.
Tensile Impact ASTM D-1822-61T, ft. lbs.
Tensile ASTM D-638-64T, Die "C" of ASTM D-412-66, psi.
Elongation ASTM D-638-64T, Die "C" of ASTM D-412-66, %.

Molecular weight distribution is indicated by the ratio of the weight average molecular weight, $M_{\overline{w}}$, to the number-average molecular weight, $M_{\overline{n}}$ ($M_{\overline{w}}/M_{\overline{n}}$)⁴. A high value for this ratio is indicative of a broad molecular weight distribution. Both weight-average and number-average molecular weight were determined by gel permeation chromatography (GPC), as described by J. C. Moore, J. Polymer Science, Part A, Vol. 2, pp. 835–843 (1964). Calibration of the GPC method was by membrane osmometry ($M_{\overline{n}}$) and light scattering ($M_{\overline{w}}$).

Impact strength is measured in foot pounds and is determined by a dart impact test. A flat sample 5 inches square and 0.125 inch thick is placed on a flat support having 3.5 inches diameter circular opening. A metal dart having a hemispherical contact point machined on a ½ inch radius (1 inch diameter) is dropped into the center of the sample from various heights until a height is reached at which the sample fails. The measured value is determined by multiplying the weight of the dart in pounds x the largest value of the height in feet from which the dart can be dropped without failure. For values of impact strength equal to or greater than 40 foot pounds a 10 pound dart is used. For lower values a 5 pound dart is used.

According to the invention hollow articles are produced by rotational molding of a polymer of ethylene, that is an ethylene homopolymer, a copolymer of ethylene and at least one acyclic straight or branched chain mono-1 olefin hydrocarbons having 3 to 8 carbon atoms per molecule, or a mixture thereof, having incorporated therein a selected crosslinking compound. A preferred group of such hydrocarbons are the straight chain hydrocarbons, particularly those straight chain hydrocarbons having 3 to 6 carbon atoms per molecule. The copolymers are usually formed from 75 to 100 weight percent ethylene. Excellent results are obtained with such copolymers of ethylene and 1-butene.

Other polymers of ethylene include, for example, copolymers of ethylene and propylene, isobutene, 1-pentene, 3-methyl-1-butene, 1-hexene, 4-methyl-1-pentene, 1-heptene, 1-octene, and 4-ethyl-1-hexene.

Suitable crosslinking compounds are disclosed in U.S. Pat. No. 3,214,422 issued to Mageli et al Oct. 26, 1965. These compounds are acetylenic diperoxy compounds and include hexynes having the formula

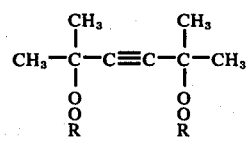

octynes having the formula

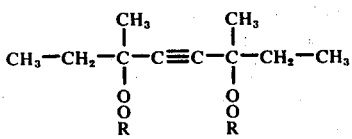

and octynes having the formula

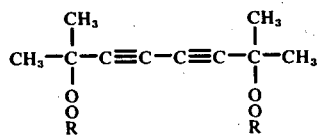

and where R is selected from the group consisting of tertiary alkyl, alkyl carbonate, and benzoate. In general, the molecular weights of the poly peroxides fall within the range of 230 to 550. Excellent results are achieved with the above-noted hexynes. Among the compounds encompassed within the above-noted hexynes, octynes and octadiynes are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6(t-butylperoxy)octyne-4
2,5-Dimethyl-2,5-di(peroxybenzoate)hexyne-3
2,5-Dimethyl-2,5-di(peroxy-n-propyl) carbonate)-hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3.

Preferably the polymers of ethylene used in the invention have a melt index of at least about 10, a density in the range of 0.920 – 0.970, preferably 0.940 – 0.965, and a molecular weight distribution not greater than about 7. Polymers having a melt index in the range of 10–200 give excellent results. Many useful products have a melt index in the range of 10–50. The polymers can be produced by any suitable method and can be selected from among those available commercially where desired. For example the polymers can be produced by the method of U.S. Pat. No. 2,825,721 of Hogan et al issued Mar. 4, 1958. The desired melt index can be obtained by visbreaking if desired. By visbreaking is meant increasing the melt index by physical working which subjects the polymer to high shearing forces. This can be accomplished, for example, by subjecting the material to working at elevated temperature in an extruder. The extruder can have specially designed screws including one or more milling sections and/or a milling head.

To stabilize the molded article to avoid a change of properties upon extended exposure to heat it is preferred that an antioxidant be incorporated into the composition prior to molding. Any suitable stabilizing antioxidant can be used. Stabilizers which have produced excellent results in the practice of the invention include polymerized trimethyl dihydroquinoline and polymerized 1,2-dihydro-2,4-trimethyl quinoline. In general of course an amount of stabilizer needed to accomplish the desired stabilization will be used and excess stabilizer generally will be avoided because of excess cost and possible detrimental effect on the product. Amounts in the range of 0.001 to 5 parts by weight per 100 parts by weight of the polymer have been suitable. Often superior stabilization without excessive cost is obtained in the range of 0.01 to 1 part by weight per 100 parts by weight of the polymer.

Other ingredients which do not adversely effect either the rotational molding or the crosslinking and which do not impart undesirable characteristics to the finished article can be added. Examples of such materials which can be added under suitable conditions and in suitable amounts include pigments, additional stabilizers such as metal complexing agents, antistatic agents, ultraviolet absorber for light stabilization, fillers, reinforcing materials, etc. However, one should make certain that any additive selected is compatible with the specific composition to permit good molding and crosslinking to obtain well formed articles having desired properties.

Some physical characteristics of polymers used in the following examples are set forth in Table I below. Polymer A is an example of the best polymers of ethylene for rotational molding known to us prior to the present invention.

Table I

| Polymer Designation | A | B | C | D |
| --- | --- | --- | --- | --- |
| Density | 0.962 | 0.955 | 0.965 | 0.955 |
| Melt Index | 6.5 | 18 | 30 | 1 (HIMI) |
| ESCR | <1 | <1 | <1 | 100 |
| Impact Strength | 35 | 32.5 | 10 | >16 |
| Tensile Strength | | | | |
| 2"/min. | 4000 | 3900 | 4000 | — |
| 20"/min | 4400 | — | — | 4100 |
| Elongation | | | | |
| 2"/min. | 280 | 275 | 8 | — |
| 20"/min. | 15 | — | — | 50 |

EXAMPLE I

Runs were made with polymer B and polymer C both with and without the crosslinking agent 2,5-dimethyl-2,5-di(t-butylperoxy)hexyne-3. In all instances the polymer was ground to pass a 35 mesh sieve number (U.S. Standard Sieve Series). For the compositions containing the crosslinking agent this agent was incorporated by blending in a commercial compounding extruder. In each run the article molded was a generally rectangular container 6 inches by 6 inches by 12 inches having a wall thickness of about 0.125 inch. Molding was done on a McNeil model 200-32R1 rotational molding machine. The results of the runs are presented in Table II below in which all of the values were obtained on samples cut from the molded articles. It will be seen that the articles made with the compositions including the crosslinking agent were outstanding in environmental stress cracking resistance, being far superior to anything previously known in rotational molding. Other properties also were excellent.

The values for environmental stress cracking resistance for the articles molded from compositions containing the crosslinking agent were far superior to values obtained from samples taken from articles molded with polymer A, which shows values less than 1 hour.

When an attempt is made to mold articles using crosslinking agents other than those covered by the present invention, properly molded articles are not obtained, due to poor distribution of the molding compound and extremely rough inner surfaces.

The crosslinking agent must be incorporated within the molding resin rather than dry blended (mixing of powders). When dry blending is used there is a very severe problem of voids in the walls of the molded articles.

bottom the containers molded from polymer A did not fail when dropped from a height of 10 feet, but failed by rupture when dropped from heights of 12 and 15 feet. Containers made from polymer C containing a crosslinking amount of the crosslinking agent of Example I did not fail when dropped from heights of 25 and 30 feet. A more severe test was then given the latter Table II

| Polymer[1] | C + 1.5 Parts Crosslinking Agent/100 Parts Resin | C + 1.5 Parts Crosslinking Agent/100 Parts Resin | C + 1.5 Parts Crosslinking Agent/100 Parts Resin[2] | C + 1.5 Parts Crosslinking Agent/100 Parts Resin[2] | B + 1.5 Parts Crosslinking Agent/100 Parts Resin |
|---|---|---|---|---|---|
| Molding Time | 13 Min. | 11 Min. | 13 Min. | 11 Min. | 13 Min. |
| Molding Temp. | 550° F. | 650° F. | 550° F. | 650° F. | 550° F. |
| HLMI | No Flow | No Flow | No Flow | No Flow | No Flow |
| Molded Density | .939 | .939 | .941 | .941 | .938 |
| Tensile Strength | | | | | |
| 2"/min. | 2600 | 2665 | 2655 | 2660 | 2440 |
| 20"/min. | 3050 | 3020 | 3030 | 3045 | 2800 |
| Elongation | | | | | |
| 2"/min. | 45% | 35% | 45% | 30% | 61% |
| 20"/min. | 34% | 29% | 36% | 32% | 50% |
| Tensile Tear | .74 | .73 | .73 | .46 | .75 |
| Tensile Impact | 66.4 | 60.9 | 67.4 | 62.0 | 83.2 |
| ESCR | >1000 | >1000 | >1000 | >1000 | >1000 |
| Impact Strength | 40 | 45 | 40 | 40 | 40 |
| Inside Surfaces | a | a | a | a | b |

| Polymer[1] | B + 1.5 Parts Crosslinking Agent/100 Parts Resin | C + 1.0 Parts Crosslinking Agent/100 Parts Resin | C + 1.0 Parts Crosslinking Agent/100 Parts Resin | C | B |
|---|---|---|---|---|---|
| Molding Time | 11 Min. | 13 Min. | 11 Min. | 12 Min. | 12 Min. |
| Molding Temp. | 650° F. | 550° F. | 650° F. | 650° F. | 650° F. |
| HLMI | No Flow | No Flow | No Flow | 5.9 | 9.7 |
| Molded Density | .935 | .944 | .945 | | .951 |
| Tensile Strength | | | | | |
| 2"/min. | 2425 | 3000 | 2630 | 3760 | 3260 |
| 20"/min. | 2770 | 3460 | 3410 | 4850 | 3600 |
| Elongation | | | | | |
| 2"/min. | 70% | 27% | 33% | 60% | 153% |
| 20"/min. | 45% | 15% | 11% | 10% | 31% |
| Tensile Tear | .75 | .78 | .81 | .42 | .443 |
| Tensile Impact | 85.8 | 59.0 | 55.3 | | |
| ESCR | >1000 | >1000 | >1000 | BOB[3] | 3 |
| Impact Strength | 40 | 37.5 | 37.5 | 10 | 32.5 |
| Inside Surfaces | b | a | a | c | c |

[1]All compositions included small amounts of antioxidants.
[2]Also contained 0.25 parts carbon black.
[3] Broke on Bending.
a - All surfaces extremely smooth.
b - Useful articles surfaces slightly wavy.
c - All surfaces slightly orange peel.

EXAMPLE II

Articles were molded under conditions comparable to the conditions of Example I with polymer A plus the crosslinking agent. The molded articles were extremely rough on the inside surface, having the appearance of irregular foamed material and the articles were completely unsatisfactory due to porosity.

EXAMPLE III

Containers made as described in Example I were compared with similar containers made from polymer A which, as noted above, was one of the best polymers previously known for rotationally molding such containers. The containers were generally rectangular 7 inches by 12 inches by 9 inches high and had a wall thickness of 0.100 inch. They were filled with water and dropped from varying heights, both the water and the containers being at 40° F. All of the containers tested were made under identical molding conditions. When the containers were dropped to land on the flat bottom the containers molded from polymer A did not fail when dropped from a height of 10 feet, but failed by rupture when dropped from heights of 12 and 15 feet. Containers made from polymer C containing a crosslinking amount of the crosslinking agent of Example I did not fail when dropped from heights of 25 and 30 feet. A more severe test was then given the latter containers by dropping from 30 feet on two different edges. No failures occurred. The containers which were dropped on the two different edges were containers which previously had been tested by dropping flat, thus indicating extremely high strength for these containers.

EXAMPLE IV

Runs were made with visbroken polymers (polymer D). In all instances the visbroken polymers were mixed with 0.75 parts of the crosslinking agent 2,5-dimethyl-2,5-di(t-butylperoxy)hexyne-3- and pelleted in a commercial compounding extruder. The pellets were ground to less than 30 mesh sieve number (U.S. Standard Sieve Series) and rotational molded into test boxes in the same manner as described in Example I. For comparison, runs were made with polymer C.

Results of the runs are presented in Table III below in which all of the values were obtained on samples obtained from the molded articles.

Table III

|   |   | Density | Impact, 30 ft. lb.* | Impact Strength (−20° F.), ft. lbs. | ESC, hours |
|---|---|---|---|---|---|
| C | Without Crosslinking Agent | 0.959 | Fail | 2.5 | BOB** |
| C | With 0.75 Parts Crosslinking Agent/100 Parts Resin | 0.933 | Pass | 60 | >1000 |
| D | Visbroken to 185MI + 0.75 Parts Crosslinking Agent/100 Parts resin | 0.938 | Not Determ. | Not Determ. | <1000 |
| D | Visbroken to 85MI + 0.75 Parts Crosslinking Agent/100 Parts Resin | 0.936 | Pass | 60 | >1000 |
| D | Visbroken to 48 MI + 0.75 Parts Crosslinking Agent/100 Parts Resin | 0.935 | Pass | 60 | >1000 |
| D | Visbroken to 29 MI + 0.75 Parts Crosslinking Agent/100 Parts Resin | 0.935 | Pass | 65 | >1000 |

*30 ft. lbs. applied according to procedure for "Impact Strength" in pass or fail test.
**Broke on bending.

It will be seen that the visbroken polymers have results comparable to those obtained with the polymer having a high melt index without visbreaking.

We claim:
1. A method for producing hollow articles which comprises:
supplying to a mold a measured amount of a powdered thermoplastic moldable material comprising a solid polymer selected from the group consisting of ethylene homopolymers, copolymers of ethylene and at least one acrylic mono-1 olefin hydrocarbon having 3 to 8 carbon atoms per molecule formed from at least 75 weight percent ethylene, and mixtures thereof, having a melt index of at least about 10 having incorporated within the molding resin a crosslinking amount of an acetylenic diperoxy compound selected from the group consisting of hexynes having the formula

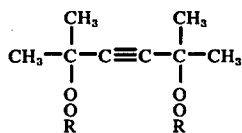

octynes having the formula

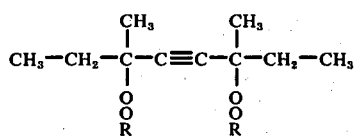

and octynes having the formula

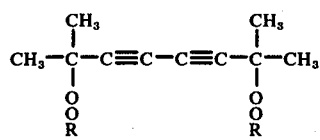

wherein R is selected from the group consisting of tertiary alkyl, alkyl carbonate, and benzoate;
rotating the mold while heating it to fuse the thermoplastic powder; and
cooling the mold to cause the hollow article to solidify whereby said article has high impact strength and environmental stress cracking resistance (ESCR) and smooth inner surface.

2. The method of claim 1 wherein said solid polymer has a density in the range of 0.920 − 0.970 and a molecular weight distribution not greater than about 7, and said diperoxy compound is a hexyne.

3. The method of claim 2 wherein said diperoxy compound is selected from the group consisting of 2,5-dimethyl-2,5-di(t-butylperoxy)hexyne-3; 2,5-dimethyl-2,5-di(peroxybenzoate)hexyne-3; 2,5-dimethyl-2,5-di(peroxy-n-propylcarbonate)hexyne-3; 2,5-dimethyl-2,5-di(peroxy isobutyl carbonate)hexyne-3; 2,5-dimethyl-2,5-di(peroxy ethyl carbonate)hexyne-3; 2,5-dimethyl-2,5-di(alpha-cumyl peroxy)hexyne-3; 2,5-dimethyl-2,5-di(peroxy beta-chloroethyl carbonate)-hexyne-3.

4. The method of claim 3 wherein said diperoxy compound is 2,5-dimethyl-2,5-di(t-butylperoxy)hexyne-3.

5. The method of claim 4 wherein said melt index is in the range of 10–200 and said diperoxy compound is present in an amount between 0.1 and 10 parts by weight per 100 parts by weight of polymer.

6. The method of claim 5 wherein said acyclic mono-1 olefin hydrocarbon having 3 to 8 carbon atoms per molecule is butene.

7. A method according to claim 1 wherein the mold is closed and is rotated around more than one axis.

8. The method according to claim 7 wherein said mold is closed and is rotated around two axes at right angles to distribute the powdered material throughout the mold.

9. A method according to claim 8 wherein said powder is ground to pass 30 mesh sieve number (U.S. Standard Sieve Series).

10. A method according to claim 8 wherein said ESCR is greater than 1000 hours (ASTM D-1693-66) and said impact strength is at least about 40 foot pounds (dart impact test).

11. A method according to claim 1 wherein said diperoxy compound is selected from the group consisting of 2,5-dimethyl-2,5-di(t-butylperoxy)hexyne-3; 2,5-dimethyl-2,5-di(peroxybenzoate)hexyne-3; 2,5-dimethyl-2,5-di(peroxy-n-propylcarbonate)hexyne-3; 2,5-dimethyl-2,5-di(peroxy isobutyl carbonate)hexyne-3; 2,5-dimethyl-2,5-di(peroxy ethyl carbonate)hexyne-3; 2,5-dimethyl-2,5-di(alphacumyl peroxy)hexyne-3; 2,5-dimethyl-2,5-di(peroxy beta-chloroethyl carbonate)-hexyne-3.

12. A method according to claim 11 wherein said diperoxy compound is 2,5-dimethyl-2,5-di(t-butylperoxy)hexyne-3.

13. A method according to claim 12 wherein said melt index is in the range of 10–200, said diperoxy compound is present in an amount between 0.1 and 10 parts by weight per 100 parts by weight of polymer and said powder is ground to pass 30 mesh sieve number (U.S. Standard Sieve Series).

14. A method according to claim 13 wherein said acyclic mono-1 olefin hydrocarbon having 3–8 carbon atoms per molecule is butene.

* * * * *

UNITED STATES PATENT OFFICE
CERTIFICATE OF CORRECTION

PATENT NO. : 4,029,729
DATED : June 14, 1977
INVENTOR(S) : Robert L. Rees, Fay W. Bailey It is certified that error appears in the above-identified patent and that said Letters Patent are hereby corrected as shown below:

Column 7, line 32, delete "acrylic" and insert --- acyclic ---.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*